Patented June 10, 1924.

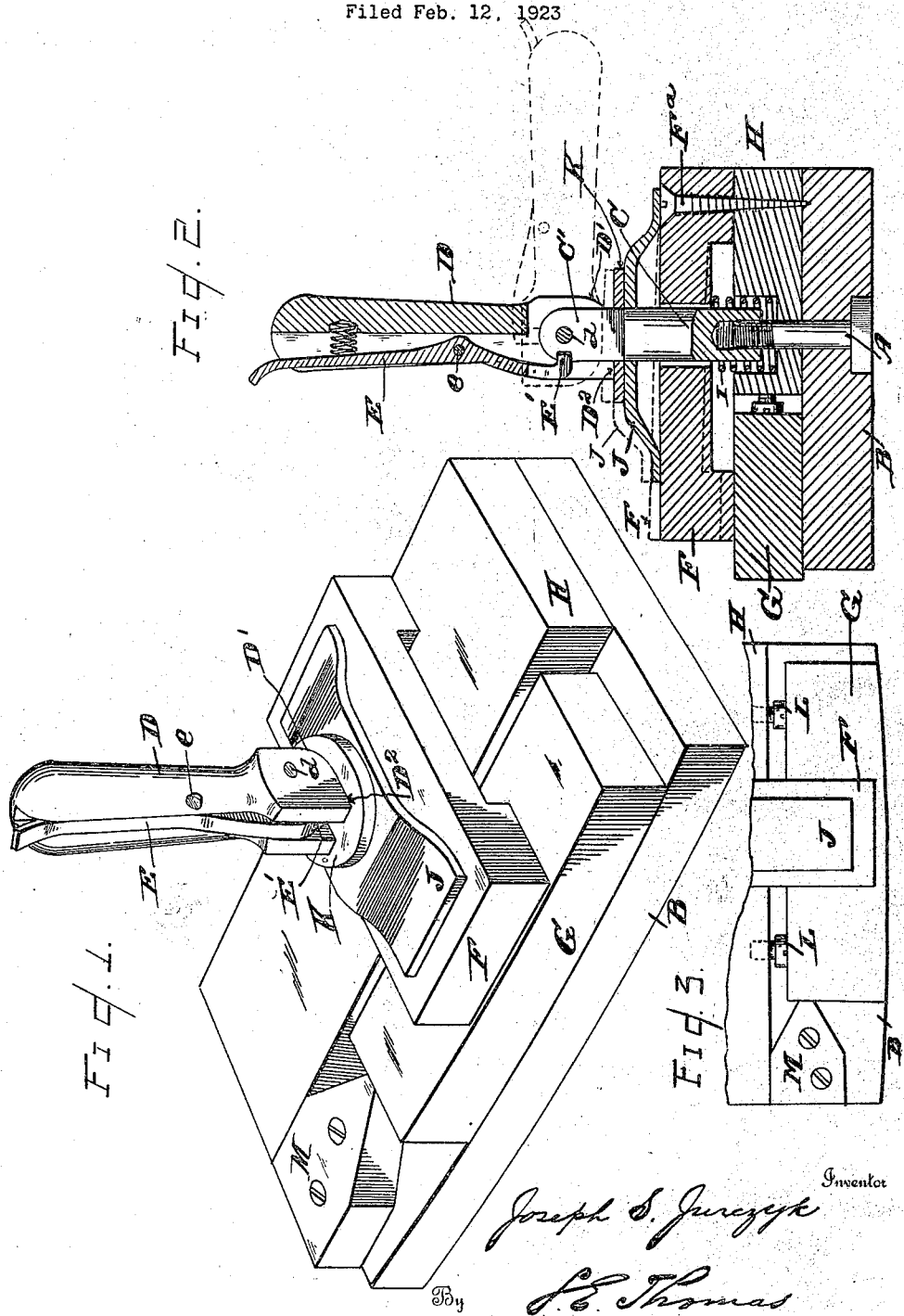

1,497,213

UNITED STATES PATENT OFFICE.

JOSEPH S. JURCZYK, OF DETROIT, MICHIGAN, ASSIGNOR TO CENTURY SAW & TOOL WORKS, OF DETROIT, MICHIGAN, A CORPORATION OF MICHIGAN.

WORK-CLAMPING DEVICE FOR SHAPERS.

Application filed February 12, 1923. Serial No. 618,519.

*To all whom it may concern:*

Be it known that I, JOSEPH S. JURCZYK, citizen of the United States, residing at Detroit, county of Wayne, State of Michigan, have invented a certain new and useful Improvement in Work-Clamping Devices for Shapers, and declare the following to be a full, clear, and exact description of the same, such as will enable others skilled in the art to which it pertains to make and use the same, reference being had to the accompanying drawings, which form a part of this specification.

My invention relates to a device for clamping an element to be machined to a jig or template or like machine.

It is well known that the handle of work clamping devices for shapers have been formed with an arc-shaped end so pivoted that it may bear upon the movable jaw of the clamping member to secure the element to be machined to the jig or template.

It is also well known that in the use of such a device the operator is liable to accidentally release the clamping handle while controlling or superintending the operation of the machine and in so doing the hand of the operator is frequently drawn into the path of the cutting tool;—resulting in serious injury to the operator.

One object of the invention therefore is to provide for locking the handle of the clamping member that it may not be accidentally released and cause the operator to be injured.

A further object of the invention is to provide means for readily adjusting the clamping member that it may hold "work" of relatively different thickness securely to the jig or template.

A further object of the invention is to provide means for forcing the clamping jaw out of gripping contact with the "work" immediately following the release of the clamping handle.

A further object is to provide resilient means adapted to yield sufficiently under the stress resulting from the operation of the handle in clamping the "work" to the template to insure the clamping member being positively locked following its adjustment to receive the element to be machined.

A further object of the invention is to provide means for adjusting the "work" with reference to the template that the outer edge or contour of the "work" may attain a predetermined distance or relation to its rear or back face at either end.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a perspective view of the clamping member showing the "work" secured to the template or jig.

Figure 2 is a vertical cross-sectional view of the device, showing in dotted lines the position of the clamping handle when the jaw is released.

Figure 3 is a fragmentary plan view of the device showing adjustable screws whereby the rear wall of the "work" may be held parallel to the stepped portion of the template or at an angle thereto, to provide for a predetermined width between the outer contour of the "work" and its rear wall.

Referring now to the letters of reference placed upon the drawings:

A, denotes a bolt projecting upwardly through the template or jig B, the latter serving also as one of the jaws of the clamping device. C is a rod or sleeve tapped to receive the threaded end of the bolt, its upper end $C^1$ being flattened to receive the handle D pivoted thereto by a transverse pin $d$.

The forked portion of the handle is formed with an arc-shaped cam on one side as indicated at $D^1$; and is rectangular in form upon the opposite side as shown in $D^2$—the purpose being to admit of the handle being tilted in one direction only,—as shown in dotted lines in Figure 2.

E is a spring actuated latch pivoted upon a pin $e$ in a longitudinal groove formed in the handle;—the hook-shaped end $E^1$ of the latch being adapted to enter a notch provided in the upper end of the stem $C^1$, thus co-operating with the shoulder $D^2$ on the handle to lock the latter against accidental release and thereby differentiating from devices having handles free to rock in either direction upon their pivots.

F is a jaw loosely secured by a bolt or screw F^a to the block H,—which may be integral with the template B. The jaw F has a limited movement sufficient to release the "work" G clamped between it and template B by the handle D.

I, is a spring projecting from a counterbore in the block H, surrounding the stem C, adapted to lift the jaw F when released from the control of the clamping handle. J is a spring plate bored for the passage of the stem C, its ends bearing upon the jaw or member F.

K is a washer encircling the stem C and resting upon the plate J to receive the thrust of the tilting handle D. L, L, are bolts supported in the member H by adjusting which the rear wall of the "work" may be inclined or made parallel with said member as desired.

M is a stop plate secured to the template.

Having indicated the several parts by reference letters the construction and operation of the device will be readily understood.

A template or jig B of desired contour having been provided, the work G is adjusted by means of the screws L, L, so that its outer edge will overlap the edge of the template to which it is to conform through the subsequent operation of the shaper.

The clamping handle is then rotated so that the stem C will be adjusted with reference to the bolt A to insure a proper gripping relation between the movable jaw F and the "work" when the handle is rocked to the position shown in Figure 1.

It will be seen that the spring plate J provides for a very close adjustment of the clamping jaws upon the "work";—it being adapted to yield sufficiently after the bolt A is adjusted closely to permit rocking the handle to a vertical position as shown.

It will also be seen that the shoulder of the handle will prevent the accidental release of the latter through tilting in one direction, while the co-operating spring latch E will prevent its accidental release in the opposite direction.

Having thus described my invention what I claim is:

1. In a device of the character described; a pair of clamping members adapted to hold an element to be machined; a screw-threaded member carried by one of the clamping members; an adjustable element tapped to receive the screw-threaded member; a handle pivoted to the adjustable element having a cam-shaped end on one side of its longitudinal axis adjoining an angular formation on the opposite side of its longitudinal axis, whereby the element to be machined may be gripped and the rocking action of the handle limited, and means for securing the handle against accidental release when operated to grip the element to be machined.

2. In a device of the character described; a pair of clamping members adapted to hold an element to be machined; a screw threaded bolt supported in one of the clamping members; an adjustable element tapped to receive the screw threaded bolt; a handle slotted to receive the end of the adjustable element pivoted thereto, the walls of the slotted portion of the handle being arc-shaped on one side of its longitudinal axis with an angular formation on the opposite side of its longitudinal axis, whereby the rocking action of the handle is limited in one direction, and means for securing the handle against accidental release when adjusted.

3. In a device of the character described; a pair of clamping members adapted to hold an element to be machined, one of said clamping members including a template; a screw threaded bolt supported in one of said clamping members; an adjustable element tapped to receive a screw threaded bolt; a handle slotted to receive the end of the adjustable element pivoted thereto, the wall of the slotted portion of the handle being cam-shaped on one side of its longitudinal axis and of angular formation on the opposite side of the longitudinal axis, whereby its rocking movement is limited in one direction, means for securing the handle against accidental release when in alignment with the longitudinal axis of the adjustable element, and a spring plate mounted upon one end of the clamping member adapted to be acted upon by the cam-shaped end of the handle.

4. In a device of the character described; a pair of clamping members adapted to hold an element to be machined; a screw threaded bolt supported on one of the clamping members; an adjustable element tapped to receive the screw threaded bolt; a handle slotted to receive the end of the adjustable element to which it is pivoted, said handle being adapted to limit its rocking movement in one direction; a spring latch pivoted to the handle and adapted to engage the adjustable element to secure the handle in locked relation to the adjustable element and a spring plate mounted upon one of said clamping members adapted to be acted upon by the handle when securing the element to be machined between the clamping members.

5. In a device of the character described; a pair of clamping members adapted to hold an element to be machined; a screw threaded bolt supported in one of the clamping members; an adjustable element tapped to receive the screw threaded bolt; a handle slotted to receive the adjustable element to which it is pivoted, said handle having a cam-shaped end on one side of its pivotal connection to said adjustable element and a shoulder on the opposite side of said pivotal connection, whereby the rocking action of the handle is limited in one direction, means for securing the handle against accidental release when adjusted; a spring plate positioned between the cam-shaped end of the handle and one of the clamping members, and a spring sleeved upon the bolt adapted to bear upon one of the clamping members to automatically force said clamping member away from the element to be machined upon rocking the handle into a releasing position.

6. In a device of the character described; a pair of clamping members for holding an element to be machined; one of which includes a template; a screw threaded bolt; an adjustable member tapped to receive the bolt; a handle pivoted to said adjustable member having a cam-shaped end on one side and a shoulder on the opposite side of the pivotal connection to limit its rocking action in one direction; a spring latch to secure the handle in locked relation to the adjustable member until manually released; a spring plate adapted to be acted upon by the tiltable handle to yieldably bear upon one of the clamping members; a spring adapted to release the clamping members from the element to be machined upon tilting the handle into released position and a pair of adjustable bolts for adjusting the position of the element to be machined with reference to the template.

In testimony whereof, I sign this specification in the presence of two witnesses.

JOSEPH S. JURCZYK.

Witnesses:
S. E. THOMAS,
MAURICE WOLF.